United States Patent [19]

Reighard et al.

[11] Patent Number: 4,607,898

[45] Date of Patent: Aug. 26, 1986

[54] SPIRAL FLEX-CIRCUIT SYSTEM FOR STEERING WHEELS

[75] Inventors: Robert P. Reighard, Toledo, Ohio; Samuel D. Kinner, Portland, Ind.; Mark Ciesielski, Maumee, Ohio

[73] Assignee: Sheller-Globe Corporation, Toledo, Ohio

[21] Appl. No.: 670,805

[22] Filed: Nov. 13, 1984

[51] Int. Cl.[4] .............................................. H01R 35/00
[52] U.S. Cl. ..................................... 339/3 S; 339/5 R
[58] Field of Search .................. 339/3 R, 3 S, 5, 17 F

[56] References Cited

U.S. PATENT DOCUMENTS

| | | | |
|---|---|---|---|
| 3,525,536 | 8/1970 | Pruneski | 339/3 S |
| 3,763,455 | 10/1973 | Confer et al. | 339/3 S |
| 4,023,879 | 5/1977 | Braund et al. | 339/17 F X |
| 4,383,148 | 5/1983 | Arima | 200/61.54 |
| 4,417,775 | 11/1983 | Sakurai et al. | 339/5 M |
| 4,422,699 | 12/1983 | Sakurai et al. | 339/3 S |

Primary Examiner—Eugene F. Desmond
Attorney, Agent, or Firm—Harness, Dickey & Pierce

[57] ABSTRACT

A conductor assembly for conveying signals between steering wheel and column to permit control of multiple functions (headlights, wipers, cruise control, etc.) from the steering wheel. Electrical connection is established through a multiple conductor ribbon-like cable which is wound about a central hub within the conductor assembly enclosure. When the wheel is turned from lock to lock, the cable doubles back upon itself so that a minimum cable length is required. To facilitate installation, the enclosure includes a self locking mechanism to insure that the cable cannot be wound or unwound until the assembly is installed on the vehicle.

14 Claims, 15 Drawing Figures

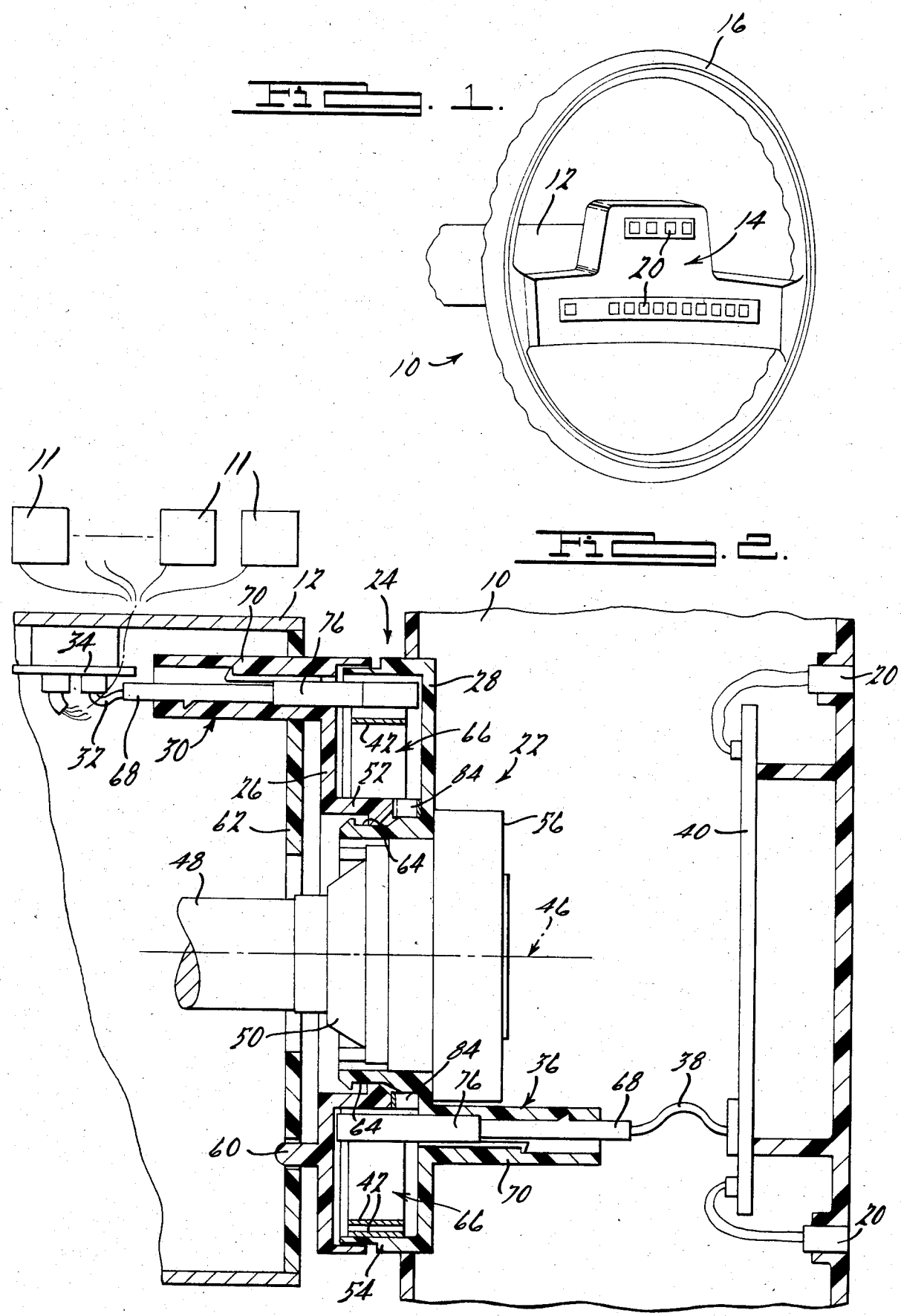

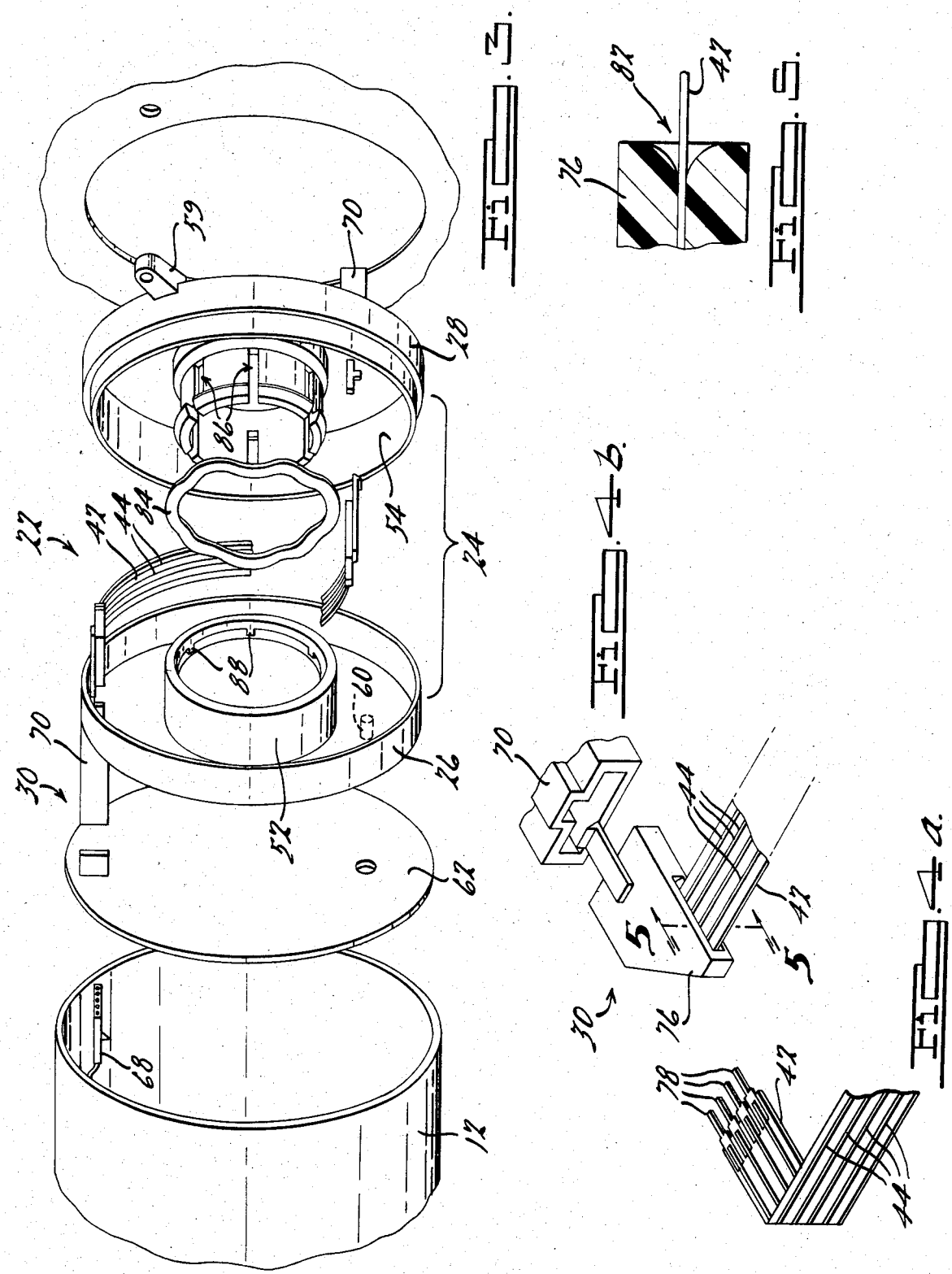

SPIRAL FLEX-CIRCUIT SYSTEM FOR STEERING WHEELS

BACKGROUND AND SUMMARY OF THE INVENTION

The invention relates generally to electrical conductor assemblies for conveying electrical signals between rotatably connected first and second members. More particularly, the invention relates to a flat, spirally-wound, multi-conductor cable assembly for conducting electrical signals between the relatively stationary steering column and relatively rotatable steering wheel of a vehicle.

In a steering wheel system, the established way of conveying electrical switching signals from the revolving steering wheel to the stationary steering column has been through the use of slip ring and brush assemblies. Because steering wheels must rotate several full turns in each direction (e.g. five turns from lock to lock), individual solid conductor wires have not proven practical.

While the use of slip ring and brush technology is generally adequate for controlling the vehicle horn, this technology does not work well with multi-function steering wheel systems. In multi-function steering wheel systems a plurality of different functions are conveniently provided on the steering wheel, usually on a centrally-located keypad forming the hub of the steering wheel. Such a multi-function steering wheel may, for example, provide keypad control of vehicle functions and devices, including cruise control, horn, headlights, high beam/low beam, windshield washer and wiper, radio tuning and volume, and so forth. Slip ring and brush technology has not proven practical in the implementation of such multi-function steering wheels, in part due to space limitations preventing multiple slip rings and separate brush assemblies for each function and also due to conductivity problems with slip rings and brushes. In addition, slip rings and brushes produce audible noise, particularly when dirty, and are relatively expensive.

In response to the growing demand for multi-function steering wheels, the Sheller-Globe Corporation, Assignee of the present invention, has developed a multi-function steering wheel employing a radiant energy link between the rotatable steering wheel and stationary steering column, using optoelectronic devices. For a further understanding of this multi-function steering wheel technology, reference may be had to copending U.S. patent application Ser. No. 475,891, filed Mar. 16, 1983 entitled "Multifunction Steering Wheel"; and U.S. patent application Ser. No. 560,550, filed Dec. 12, 1983 entitled "Multifunction Steering Wheel". Both of said patent applications are assigned to the Assignee of the present invention.

To complement the above-described multi-function steering wheel technology, and to provide an economical and reliable alternative to the optoelectronic technology, the present invention provides a conductor assembly for conveying electrical signals between rotatably connected first and second members. The invention comprises a means for defining an enclosure carried on one of the first and second members, the enclosure defining an axis. The enclosure may be fashioned as two interfitting halves, one half coupled to the steering column and the other half coupled to the steering wheel. An elongated and flexible ribbon-like conductive cable is disposed within the enclosure and provides multiple conductive current conductive courses which are arranged substantially parallel to one another in a plane curving about the axis in spiral fashion. A first connector is electrically coupled to the conductive courses and is carried in fixed relationship to the steering column, while a second conductor is electrically coupled to the conductive courses and is carried in fixed relationship to the steering wheel. These electrical connectors are disposed at opposite ends of the ribbon-like cable and are carried upon the respective halves of the enclosure to retain the ribbon-like cable within the enclosure.

The ribbon-like cable is of a length permitting unrestrained rotation of the steering wheel from lock to lock. The cable length is such that rotation from lock to lock causes the cable to double back upon itself, whereby at one extreme end of rotation it is spirally clockwise wound and at the other extreme end of rotation it is spirally counter clockwise wound. The first and second connectors receive the ribbon-like cable in a slotted opening having flared and rounded edges to relieve strain and to prevent the cable from being kinked or sharply bent. The multiple conductive course are usable to convey control signals to individual vehicle devices and functions, wherein each conductive course is dedicated to the control of one such device or function. Alternatively, the conductive courses may convey multiplexed control signals, wherein one or more individual conductive courses control the operation of several devices or functions, each device or function responsive to its own unique encoded signal.

For a more complete understanding of the invention, its objects and advantages, reference may be had to the following specification and to the accompanying drawings.

BRIEF DESCRIPTION OF THE DRAWINGS

FIG. 1 illustrates a multi-function steering wheel and its associated steering column;

FIG. 2 is a cross-sectional view of the steering wheel and column of FIG. 1;

FIG. 3 is an exploded perspective view of the steering column and conductor assembly of the invention;

FIGS. 4a and 4b illustrate the connector of the conductor assembly in greater detail;

FIG. 5 is a cross-sectional detail view of one of the connectors of the invention taken substantially along the line 5—5 of FIG. 4a.

DESCRIPTION OF THE PREFERRED EMBODIMENT

Figure 6:
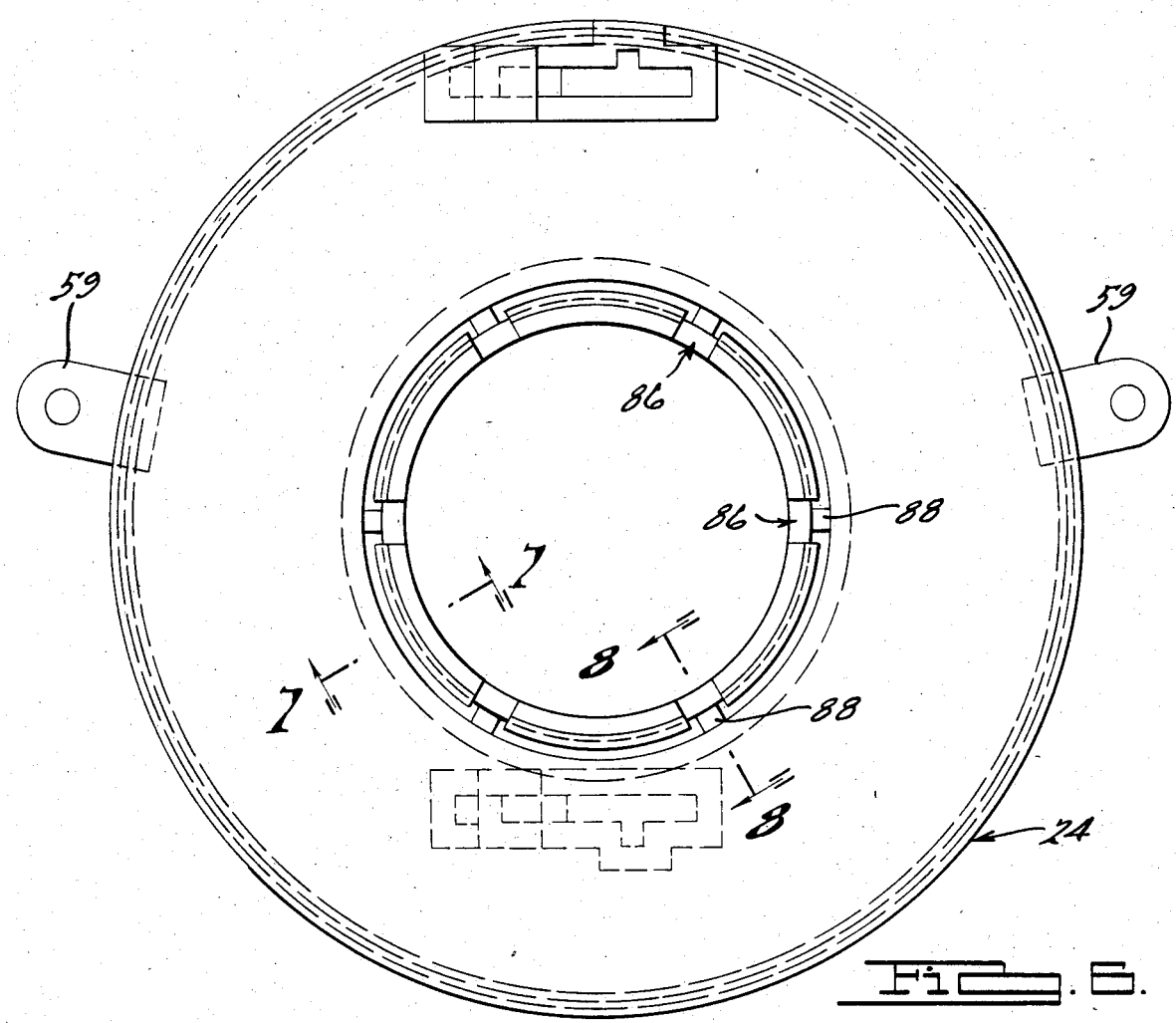
FIG. 6 is a plan view of the conductor assembly shell, showing the locking mechanism of the invention.

Referring to FIG. 1, a multi-function steering wheel is illustrated generally at 10. Steering wheel 10 is rotatably carried on steering column 12 and includes a central hub 14 having spoke-like arms connected to the outer wheel portion 16. Hub 14 includes keypad 20 for manual selection of different vehicle functions.

FIGS. 2 and 3 illustrate the conductor assembly of the invention 22 disposed between and carried on steering column 12 and steering wheel 10. More specifically, the conductor assembly includes an outer housing or shell 24, a first half 26 of which is carried by steering column 12 and a second half 28 is carried by steering wheel 10. The first and second halves are rotatble with respect to one another. Face plate 62 of column 12 carries a connector 30 which electrically communicates with the internal conductor assembly of the invention and provides a means for coupling cable 32 thereto. Cable 32 is disposed within the steering column 12 and communicates with the plurality of vehicle functions or devices 11, either directly or through an interface circuit 34 used to demultiplex or decode control signals. Functions or devices 11 may be any electrically actuable vehicle functions or devices, such as windshield wipers, headlights, cruise control, radio, and the like. The second half 28 of shell 24 is similarly provided with a connector 36 for electrically connecting cable 38 to the internal conductor assembly of the invention. Cable 38 connects with keypad 20 and may be implemented using a flat multiple conductor cable, or the like. Cable 38 may be directly coupled to the switches of keypad 20 or it may be coupled to an interface circuit 40, which is in turn coupled to the keypad 20. Interface circuit 40 may include multiplexing circuits or encoding circuits for generating a plurality of distinguishable coded signals, each operating a different vehicle function or device. In an interface circuit 40 is implemented, electrical power for driving the circuit may be derived from the vehicle battery or power system and coupled through conductor assembly 22.

FIG. 3 depicts the conductor assembly 22 in greater detail. Housed within shell 24 of conductor assembly 22 is a flexible multi-conductor cable 42 electrically connected at its respective ends to connectors 30 and 36. Flexible cable 42 is generally elongated and ribbon-like and provides a plurality of conductive courses or traces 44. Cable 42 may be fabricated by sandwiching copper conductor courses between laminants of plastic material such as Kevlar or Mylar. Conductive courses 44 are generally parallel to one another and are arranged in a plane curving about the central axis 46 of shell 24. Flexible cable 42 may be fabricated so that opposite sides of the cable are of different plastic materials to reduce friction and prevent noise when the spirally-wound cable doubles back upon itself during rotation of the wheel from lock to lock. Alternatively, one face of the cable may be fabricated with a glossy finish and the opposite face with a matte finish to achieve the same reduction in friction and noise.

Although not critical, the length of flexible cable 42 is determined by geometry of the shell 24. Shell 24 is adapted to fit concentrically about the steering wheel axle 48 and wheel hub assembly 50. The first half 26 of shell 24 forms a central hub 52, shown best in FIG. 3, the outer circumference of which defines the inner limit of an annular space 66 in which flexible cable 42 is disposed. The length of flexible cable 42 is in part dependent upon the outer circumference of this central hub 52. Additionally, the second half 28 of shell 24 is provided with an outer hub 54, shown best in FIG. 3, the inner circumference of which defines the outer limit of the annular space 66 in which flexible cable 42 is disposed. The inner circumference of outer hub 54 also determines the length of flexible cable 42. Also, determinative of the length of cable 42 is the number of rotations which the steering wheel must make from lock to lock. Although the cable length may be selectively sufficiently long to allow it to be spirally wound in one unchanging rotational direction (clockwise or counter clockwise), the preferred embodiment uses a cable length designed to allow the cable to be spirally wound in either or both rotational directions depending upon the angular position of the wheel relative to the lock to lock end points. This is accomplished by selecting the cable length so that the cable convolves or doubles back upon itself as the steering wheel rotates through its full rotational range of travel. The following formula may be used to determine the approximate cable length to implement this double back operation.

L = approximate cable length
$C_1$ = outer circumference of central hub 52
$C_o$ = inner circumference of outer hub 54
n = number of steering wheel turns from lock to lock
pi = 3.14159

$$L = \frac{nC_1}{2} + \frac{C_o - C_1}{2pi}$$

Referring back to FIG. 2, second half 28 is retained by central hub 56 and secured with lugs 59 to the steering wheel. Second half 28 of hell 24 thus remains in a fixed relationship with and rotates with the steering wheel. First half 26 of shell 24 is disposed adjacent steering column 12 and is held in fixed relationship to steering column 12 by locking pin 60, which registers with an opening in face plate 62 of steering column 12. First half 26 of shell 24 is thus relatively stationary and supports second half 28 on journal surface 64 for relative rotation. Annular space 66 is defined between central hub 52 and outer hub 54. Flexible cable 42 is spirally wound within this annular space 66.

Connectors 30 and 36 are electrically coupled to opposite ends of flexible cable 42. Specifically, the opposite ends of cable 42 are folded (FIG. 4a) to make right angle bends and the folded ends are encased within plug members 76, shown in FIG. 4b. The folded ends are provided with crimped on contacts 78 which make electrical contact with internal contact of plug member 68. Plug members 68 are used to terminate cables 32 and 38, see FIGS. 2 and 3. Plug members 76 and 68 interconnect via intermediate plug members 70, preferably integrally formed in the halves of shell 24. To prevent cable 42 from kinking or bending, plug member 76 has a flared slotted opening 82 having rounded contours to permit cable 42 to repeatedly flex in both directions without breaking or fatigue.

Figure 7:
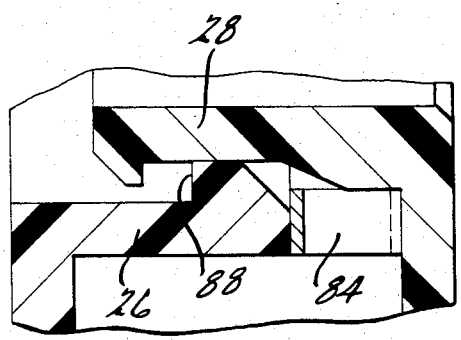
FIG. 7 is a cross-sectional view taken substantially along the line 7—7 of FIG. 6.
Figure 8:
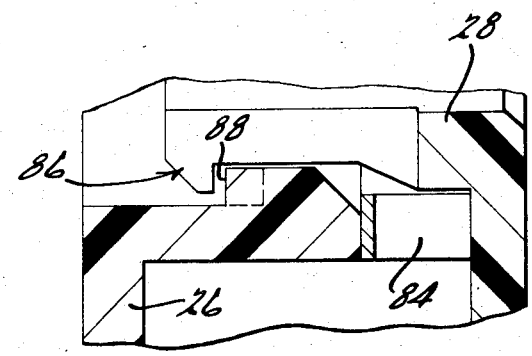
FIG. 8 is a cross-sectional view taken substantially along the line 8—8 of FIG. 6.
Figure 9:
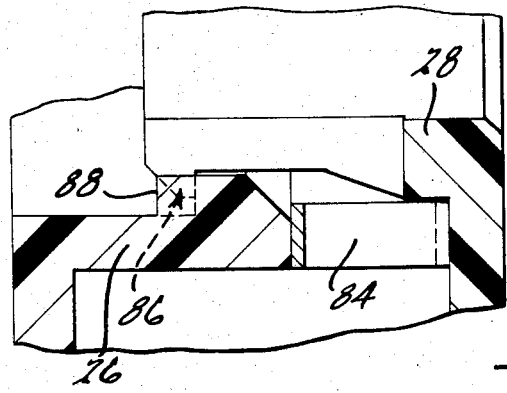
FIG. 9 is a cross-sectional view similar to that of FIG. 8, but illustrating the shell in its locked position.

Referring again to FIGS. 2 and 3, with additional reference to FIGS. 6–9, shell 24 is constructed so that relative rotational movement between first half 26 and second half 28 is prevented until the shell is properly installed between steering wheel and steering column. Shell 24 is provided with a bias spring mechanism 84 which urges the first and second halves apart from one another. When so urged, the locking cogs 86 of second half 28 engage the teeth 88 or first half 26, thereby preventing relative rotational movement. When shell 24 is installed upon connector hub 56 between steering wheel and steering column, and when the steering wheel is tightened down into place, the first and second halves are squeezed together against the force of bias spring 84 causing locking gears 86 and teeth 88 to disengage. FIGS. 7 and 8 illustrate the disengaged position, while FIG. 9 illustrates the engaged position. This locking feature is used to ensure that the conductor assembly 22 will allow full steering wheel rotation in both directions. Shell 24 would normally be rotationally oriented to a center position (shown in FIG. 12) at the manufacturing facility. Before installing the conductor assembly, the steering wheel is also rotated to its center position. Thus, when the shell containing conductor assembly 22 is installed, the locking mechanism ensures full rotation of the wheel in both directions.

Figure 10:
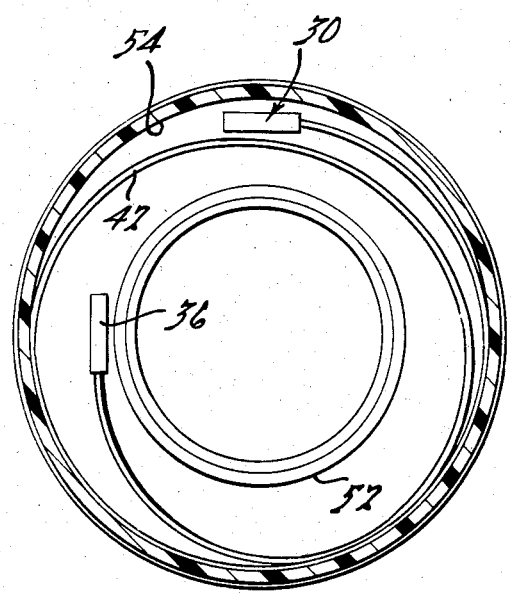
FIGS. 10 through 14 illustrate the spiral flexing action of the multiple conductor cable assembly in operation.
Figure 11:
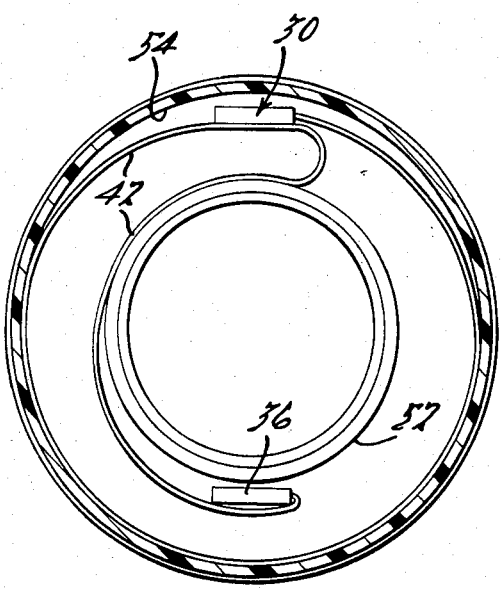
Figure 12:
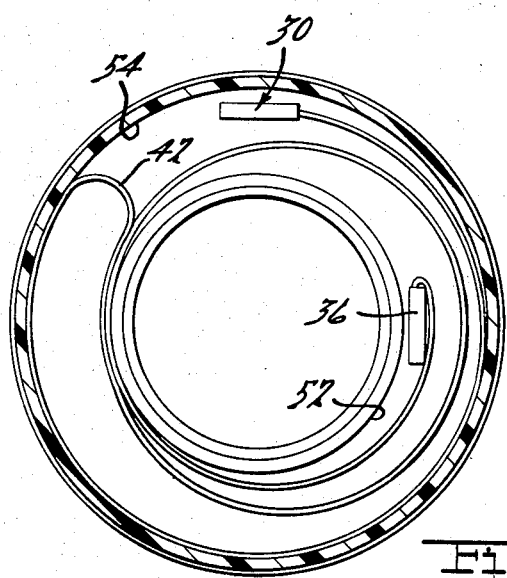
Figure 13:
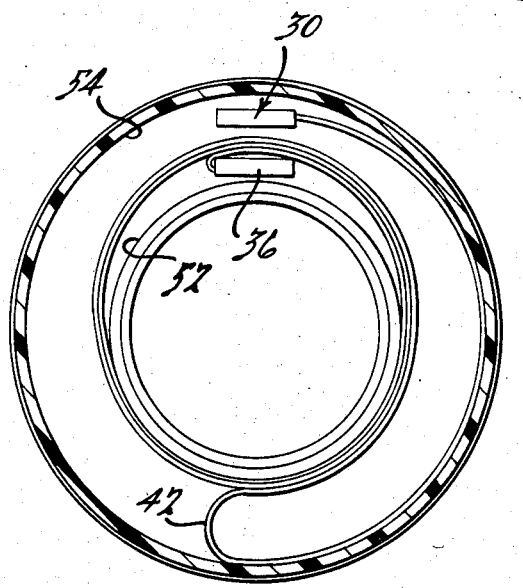
Figure 14:
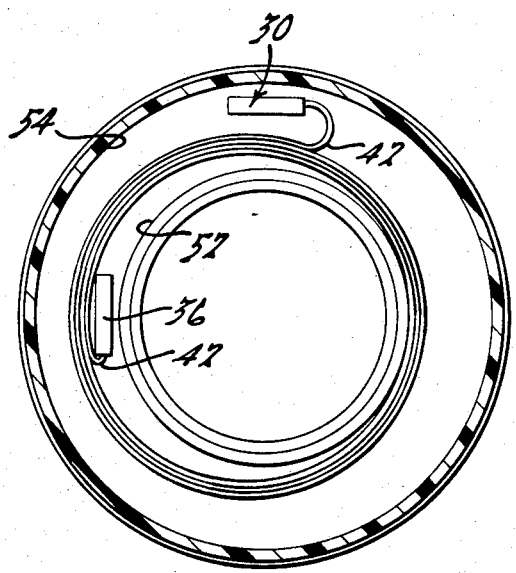

FIGS. 10 through 14 illustrate the manner in which flexible cable 42 operates when the invention is in use. FIG. 10 represents the general spatial configuration of cable 42 when the steering wheel is in its full clockwise position. FIG. 14 illustrates the general spatial configuration of cable 42 when the steering wheel is in its full counter clockwise position. FIG. 12 illustrates the general spatial configuration of cable 42 when the steering wheel is at its center position, while FIGS. 11 and 13 illustrate the cable configuration at other intermediate positions clockwise of center (FIG. 11) and counter clockwise of center (FIG. 13). By comparing FIGS. 10 through 14 it will be noted in this presently preferred embodiment cable 42 doubles back upon itself so that it may assume both clockwise and counter clockwise spirals or combinations of both. For example, in FIG. 10, cable 42 spirals outwardly in a counter clockwise direction; in FIG. 14 the cable spirals outwardly in a clockwise direction. In FIGS. 11, 12 and 13, cable 42 assumes more complex shapes, made up in part by spirally shaped components.

While the presently preferred embodiment implements the above described double back feature, whereby cable 42 can assume both clockwise and counter clockwise spiral configurations, the invention may also be implemented using longer cables whereby the full rotational range of the steering wheel is accommodated without having cable 42 double back upon itself. In such an alternate embodiment, the length of cable 42 would be selected so that it would always remain wound either spirally clockwise or spirally counter clockwise with changes in the angular position of the steering wheel affecting the tightness with which the cable is wound.

While the preferred embodiment of this invention has been illustrated and described in detail, it will be apparent that various modifications as to the details of construction and design may be made without departing from the spirit of the invention or the scope of the following claims.

What is claimed is:

1. A conductor assembly for conveying electrical signals between a vehicle steering wheel member and steering column member, said wheel member being rotatable with respect to said column member a predetermined number of rotations between clockwise and counter clockwise limits, comprising:

means for defining an enclosure carried on one of said wheel and said column members, said enclosure defining an inner circumferential dimension;

a hub centrally disposed within said enclosure and rotatable with respect to said enclosure defining means and defining an outer circumferential dimension; and an elongated and flexible ribbon-like cable having at least one conductive course and being disposed within said enclosure, one end of said cable being stationary relative to said enclosure defining means and the other end of said cable being stationary relative to said hub;

said cable having a length generally equal to one half said predetermined number of rotations times said outer circumferential dimension plus the radial spacing between the inner and outer circumferential dimensions;

said cable being substantially wound about said hub with a first sense of rotation when said wheel member is rotated to said clockwise limit and said cable being substantially wound about said hub with a second sense of rotation when said wheel member is rotated to said counter clockwise limit.

2. The conductor assembly of claim 1 wherein said cable is doubled back upon itself when said wheel member is rotated to an intermediate position between said limits.

3. The conductor assembly of claim 1 further comprising connector means for terminating said other end of said cable, said connector means having flared slotted opening for receiving said cable and for permitting bidirectional flexing of said cable at said termination.

4. The conductor assembly of claim 1 wherein said cable provides a plurality of conductive courses.

5. The conductor assembly of claim 1 further comprising means for selectively preventing said hub from rotating relative to said enclosure defining means.

6. The conductor assembly of claim 1 wherein said enclosure defining means is adapted for assembly between said wheel member and said column member and includes means for automatically preventing said hub from rotating relative to said enclosure defining means when said enclosure defining means is removed from assembly between said wheel member and said column member.

7. The conductor assembly of claim 1 wherein said enclosure defining means also defines said hub.

8. The conductor assembly of claim 1 wherein said enclosure defining means comprises first and second interfitting halves, said halves being moveable between an unlocked relationship, whereby said halves are permitted to rotate relative to one another, and a locked relationship, whereby said halves are prevented from rotating relative to one another.

9. The conductor assembly of claim 8 further comprising means for biasing said halves towards said locked relationship.

10. A conductor assembly for conveying electrical signals between a vehicle steering wheel member and a steering column member, said wheel member being rotatable with respect to said column member through a centered position and rotatable between clockise and counter clockwise limits, comprising:

a shell member having first and second mating halves, said shell member defining an outer hub and a central hub concentric with said outer hub and defining an annular space between said hubs;

an elongated and flexible ribbon-like conductive cable disposed within said annular space, one end of said cable being stationary relative to said central hub and the other end of said cable being stationary relative to said outer hub;

said first and second mating halves of said shell member having integral concentric means for telescopically holding said halves together for axial movement between a first axial position and a second axial position;

locking means on said concentric means for permitting rotational movement of one of said mating halves relative to the other when in said first axial position and for preventing rotational movement of one of said mating halves relative to the other when in said second axial position; and means for biasing said concentric means in said second position.

11. The conductor assembly of claim 10 wherein said biasing means comprises a bias spring.

12. The conductor assembly of claim 11 wherein said biasing means comprises annular bias spring coaxial with said concentric means.

13. The conductor assembly of claim 10 wherein said cable is doubled back upon itself when said wheel member is in said centered position.

14. The conductor assembly of claim 10 wherein said locking means comprises cog and teeth means engageable to prevent rotational movement of one of said mating halves relative to the other.

* * * * *